(12) United States Patent
Naserian et al.

(10) Patent No.: US 11,715,373 B2
(45) Date of Patent: Aug. 1, 2023

(54) TRAFFIC LIGHT VISIBILITY DETECTION AND AUGMENTED DISPLAY

(71) Applicant: GM GLOBAL TECHNOLOGY OPERATIONS LLC, Detroit, MI (US)

(72) Inventors: Mohammad Naserian, Windsor (CA); Feiyu Cong, Shanghai (CN); Jie Zhu, Shanghai (CN); Curtis L. Hay, Washington Township, MI (US); Priya B. Abraham, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/456,723

(22) Filed: Nov. 29, 2021

(65) Prior Publication Data

US 2023/0133131 A1  May 4, 2023

(30) Foreign Application Priority Data

Oct. 29, 2021 (CN) .......................... 202111268575.8

(51) Int. Cl.
| | | |
|---|---|---|
| *G08G 1/0967* | (2006.01) | |
| *G06T 7/50* | (2017.01) | |
| *G06T 7/60* | (2017.01) | |
| *G06F 3/14* | (2006.01) | |
| *G08G 1/01* | (2006.01) | |
| *G01S 19/42* | (2010.01) | |
| *B60K 35/00* | (2006.01) | |

(52) U.S. Cl.
CPC ............. *G08G 1/0967* (2013.01); *G06F 3/14* (2013.01); *G06T 7/50* (2017.01); *G06T 7/60* (2013.01); *G08G 1/01* (2013.01); *B60K 35/00* (2013.01); *B60K 2370/1529* (2019.05); *B60K 2370/177* (2019.05); *B60K 2370/178* (2019.05); *B60K 2370/179* (2019.05); *G01S 19/42* (2013.01); *G06T 2207/10028* (2013.01); *G06T 2207/30252* (2013.01)

(58) Field of Classification Search
CPC .......... G08G 1/0967; G08G 1/01; G06T 7/50; G06T 7/60; G06T 2207/10028; G06T 2207/30252; G06F 3/14; B60K 2370/1529; B60K 2370/177; B60K 2370/178; B60K 2370/179; B60K 35/00; G01S 19/42

See application file for complete search history.

(56) References Cited

U.S. PATENT DOCUMENTS

| | | | | |
|---|---|---|---|---|
| 2005/0280553 A1* | 12/2005 | DiPiazza | ................. | G08G 1/164 340/905 |
| 2009/0063030 A1* | 3/2009 | Howarter | ......... | G08G 1/096783 701/117 |

(Continued)

*Primary Examiner* — Christopher E Leiby
(74) *Attorney, Agent, or Firm* — Lorenz & Kopf LLP

(57) ABSTRACT

A method for capturing, by a host vehicle camera, an image of a leading vehicle, estimating a leading vehicle dimension and a first distance between a host vehicle and the leading vehicle in response to the image, receiving a data indicative of a traffic signal location and a traffic signal cycle state, determining a second distance between the host vehicle and the traffic signal, estimating a traffic signal view obstruction in response to the leading vehicle dimension, the first distance, and the second distance, and generating a graphical user interface indicative of the traffic signal cycle state in response to the traffic signal view obstruction.

20 Claims, 6 Drawing Sheets

(56) References Cited

U.S. PATENT DOCUMENTS

| | | | | |
|---|---|---|---|---|
| 2012/0013713 | A1* | 1/2012 | Sumitomo | G06T 7/246 |
| | | | | 348/46 |
| 2014/0019005 | A1* | 1/2014 | Lee | G08G 1/0962 |
| | | | | 701/301 |
| 2015/0321606 | A1* | 11/2015 | Vartanian | G02B 27/0179 |
| | | | | 348/148 |
| 2018/0012088 | A1* | 1/2018 | Matsuo | G06V 20/584 |
| 2018/0286233 | A1* | 10/2018 | Suzuki | G08G 1/096783 |
| 2020/0081448 | A1* | 3/2020 | Creusot | G06V 10/82 |
| 2020/0158530 | A1* | 5/2020 | Xu | G08G 1/096822 |
| 2020/0174261 | A1* | 6/2020 | Uenohara | G02B 27/01 |
| 2020/0250443 | A1* | 8/2020 | Suzuki | G06V 20/582 |
| 2020/0361482 | A1* | 11/2020 | Choi | B60W 50/14 |
| 2021/0097314 | A1* | 4/2021 | Scanlon | G06V 20/584 |
| 2021/0174673 | A1* | 6/2021 | Mimura | G08G 1/096791 |
| 2021/0278539 | A1* | 9/2021 | Laddha | G01S 17/42 |
| 2021/0303886 | A1* | 9/2021 | Hassan | G06K 9/6256 |

* cited by examiner

500

TRAFFIC LIGHT VISIBILITY DETECTION AND AUGMENTED DISPLAY

CROSS REFERENCE TO RELATED APPLICATIONS

This application claims the benefit of Chinese Application No. 202111268575.8, filed Oct. 29, 2021 which is herein incorporated by reference in its entirety.

INTRODUCTION

The present disclosure relates generally to a system for providing traffic signal information to a driver within a motor vehicle. More specifically, aspects of the present disclosure relate to systems, methods and devices for determining an operator visibility of a traffic signal, controlling a vehicle in order to enhance the operator visibility and providing a traffic signal state information to a vehicle operator.

Communications systems, such as vehicle to everything (V2X) communications have enabled modern vehicles to communicate with data networks, proximate infrastructure, and other vehicles. These communications allow data to be exchanged, crowdsourced and analyzed to provide more information to these vehicles than was ever available before. For example, using signal phase and timing (SPaT) messaging enables traffic signal controllers to provide additional information to proximate vehicles, such as current light states for each lane of an intersection and time to state change for the lights. This information allows the vehicle to provide additional information and warnings to the driver about conditions that may not be readily apparent.

When operating a vehicle, a problem often arises in that a vehicle operators view may be blocked by other proximate vehicles. This problem is exasperated in the case where the vehicle is a smaller vehicle, such as a car, and the proximate vehicles are much larger, such as transport trucks or the like. A particular problem arises when a vehicle operator cannot view traffic signals when the view of the traffic signal is blocked by a larger vehicle. This problem may even exist for a vehicle equipped with advanced driver-assistance systems (ADAS) in that the vehicle may not be able to determine a state of the traffic signal using vehicle cameras and sensors. In addition, if a vehicle operator is unsure of a traffic signal state and the ADAS equipped vehicle begins moving, the operator may unnecessarily disengage the ADAS system. It would be desirable to provide a traffic light notification system to a vehicle operator while overcoming the aforementioned problems.

The above information disclosed in this background section is only for enhancement of understanding of the background of the invention and therefore it may contain information that does not form the prior art that is already known in this country to a person of ordinary skill in the art.

SUMMARY

Disclosed herein are vehicle sensor methods and systems and related control logic for provisioning vehicle systems, methods for making and methods for operating such systems, and motor vehicles equipped with onboard control systems. By way of example, and not limitation, there are presented various embodiments of systems for the accurate determination of a traffic signal view obstruction and appropriate driver notification of traffic light state changes and a method for performing a driver view analysis and traffic light notification in a motor vehicle herein.

In accordance with an aspect of the present disclosure, an apparatus including a camera for capturing an image wherein the image includes a representation of a leading vehicle, a receiver configured to receive a traffic signal location and a traffic signal cycle state, a processor configured to estimate a leading vehicle dimension, a first distance between a host vehicle and the leading vehicle in response to the image, a second distance between the host vehicle and the traffic signal, estimating a traffic signal view obstruction in response to the leading vehicle dimension, the first distance, and the second distance, and generating a graphical user interface in response to the traffic signal view obstruction, and a display configured to display the graphical user interface wherein the graphical user interface is indicative of the traffic signal cycle state.

In accordance with an aspect of the present disclosure, a global positioning system for receiving a data indicative of a host vehicle location.

In accordance with an aspect of the present disclosure, a memory for storing a map data indicative of a traffic signal location.

In accordance with an aspect of the present disclosure, wherein the display is a heads up display.

In accordance with an aspect of the present disclosure, wherein the traffic signal view obstruction is estimated in response to a portion of the leading vehicle being within a line of sight between the host vehicle and the traffic signal.

In accordance with an aspect of the present disclosure, a lidar configured to capture a depth map indicative of the leading vehicle dimension and the first distance.

In accordance with an aspect of the present disclosure, wherein the receiver is a SPaT receiver and the traffic signal location and the traffic signal cycle state are indicated in a SPaT message.

In accordance with an aspect of the present disclosure, a vehicle controller indicative of a host vehicle speed and wherein the processor is further configured to determine a future traffic signal view obstruction in response to the host vehicle speed, the leading vehicle dimension, the first distance, and the second distance and for generating a driver alert in response to the future traffic signal obstruction.

In accordance with an aspect of the present disclosure, wherein the graphical user interface is an augmented reality representation of a traffic signal indicative of the traffic signal cycle state and wherein the display is an augmented reality heads up display.

In accordance with an aspect of the present disclosure, a method including capturing, by a host vehicle camera, an image of a leading vehicle, estimating a leading vehicle dimension and a first distance between a host vehicle and the leading vehicle in response to the image, receiving a data indicative of a traffic signal location and a traffic signal cycle state, determining a second distance between the host vehicle and the traffic signal, estimating a traffic signal view obstruction in response to the leading vehicle dimension, the first distance, and the second distance, and generating a graphical user interface indicative of the traffic signal cycle state in response to the traffic signal view obstruction.

In accordance with an aspect of the present disclosure, determining a host vehicle location in response to a location data received via a global positioning system.

In accordance with an aspect of the present disclosure, displaying the graphical user interface to a vehicle operator via a heads up display.

In accordance with an aspect of the present disclosure, wherein the data indicative of the traffic signal location is stored in a memory in the host vehicle.

In accordance with an aspect of the present disclosure, wherein the traffic signal view obstruction is estimated in response to a portion of the leading vehicle being within a line of sight between the host vehicle and the traffic signal.

In accordance with an aspect of the present disclosure, wherein the leading vehicle dimension and the first distance between a host vehicle and the leading vehicle are determined in response to a depth map generated by a host vehicle lidar system.

In accordance with an aspect of the present disclosure, wherein the data indicative of the traffic signal location and the traffic signal cycle state is received via a SPaT data message received by a SPaT data receiver.

In accordance with an aspect of the present disclosure, determining a future traffic signal view obstruction in response to a host vehicle speed, the leading vehicle dimension, the first distance, and the second distance and for generating a driver alert in response to the future traffic signal obstruction.

In accordance with an aspect of the present disclosure, wherein the graphical user interface is an augmented reality representation of a traffic signal indicative of the traffic signal cycle state and is presented to a vehicle operator on an augmented reality heads up display.

In accordance with an aspect of the present disclosure, a vehicle control system including a global positioning system configured for receiving a location data indicative of a host vehicle location, a host vehicle sensor for detecting a leading vehicle dimension and a first distance between a host vehicle and the leading vehicle, a receiver configured to receive a traffic signal data indicative of a traffic signal location and a traffic signal cycle state, a processor configured to determine a traffic signal view obstruction between the host vehicle and a traffic signal in response to the host vehicle location, the first distance, the traffic signal location and the leading vehicle dimension, and a display configured to display a representation of the traffic signal in response to the determination of the traffic signal view obstruction and the traffic signal cycle state.

In accordance with an aspect of the present disclosure, a vehicle controller for detecting a host vehicle speed and wherein the processor is further configured to determine a future traffic signal view obstruction in response to the host vehicle speed, the leading vehicle dimension, the first distance, and the traffic signal location and for generating a driver alert in response to the future traffic signal obstruction.

The above advantage and other advantages and features of the present disclosure will be apparent from the following detailed description of the preferred embodiments when taken in connection with the accompanying drawings.

BRIEF DESCRIPTION OF THE DRAWINGS

The exemplary embodiments will hereinafter be described in conjunction with the following drawing figures, wherein like numerals denote like elements, and wherein.

The exemplifications set out herein illustrate preferred embodiments of the invention, and such exemplifications are not to be construed as limiting the scope of the invention in any manner.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
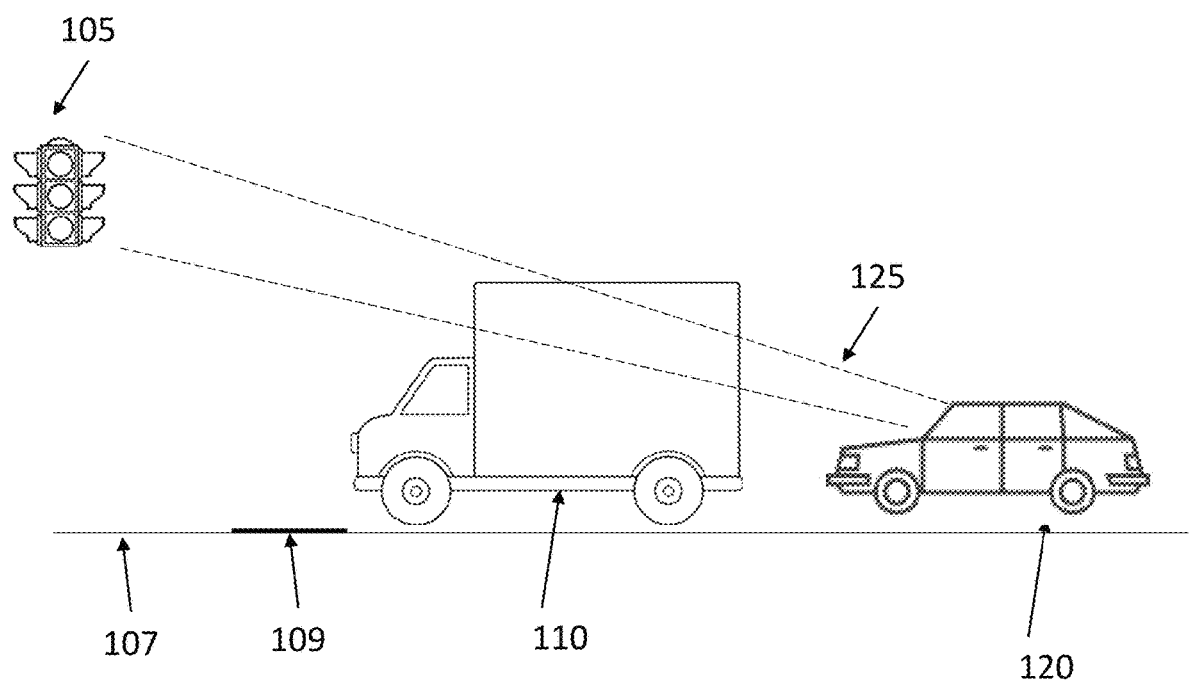
FIG. 1 shows an exemplary environment for use of the traffic light visibility detection and augmented display system according to an exemplary embodiment of the present disclosure.

Turning now to FIG. 1, an exemplary environment 100 for use of the traffic light visibility detection and augmented display system according to an exemplary embodiment of the present disclosure is shown. The exemplary environment 100 depicts a road surface 107 leading to traffic light 105 having a stop line 109, and a first vehicle 110, and a host vehicle 120.

In this exemplary embodiment, the first vehicle 110 and the host vehicle 120 are depicted as waiting for a change of state of the traffic light 105. The vehicle operator's view 125 of the traffic signal 105 from the host vehicle 120 is obstructed by the first vehicle 110. A camera system of an ADAS equipped vehicle may also not detect the light because the view 125 is blocked.

An exemplary system is proposed to assist a vehicle operator and/or ADAS sensor in determining a traffic signal state. The system is first configured to determine a location of the traffic signal 105. The location may be determined in response to map data, data transmitted from the traffic signal to the host vehicle via a vehicle to infrastructure (V2I) communications and/or in response to an image captured by a host vehicle camera.

The system may next estimate a width and/or height of the first vehicle 110 in front of the host vehicle 120 using an image captured by a host vehicle camera or in response to a Lidar depth map or the like. The dimensions of the first vehicle 110 may also be determined in response to data transmitted from the first vehicle 110 to the host vehicle via a vehicle to vehicle (V2V) communications. For example, the first vehicle 110 may be configured to transmit a set of dimensions of the first vehicle 110 in response to a request from the host vehicle 120.

The exemplary system may next be configured to determine if the first vehicle 110 height or width is larger than a threshold value wherein the threshold value is indicative of a high probability of an obstructed view for the host vehicle 120. The exemplary system may then adjust the longitudinal distance between the first vehicle 110 and the host vehicle 120 with vehicle speed, vehicle height, and distance to the intersection with the traffic light such that the traffic light will fall into the field of view 125 of the host vehicle. Alternatively, if the distance between the first vehicle 110 and the host vehicle 120 is less than the required longitudinal distance to the first vehicle 120 such that the host vehicle view 125 is likely obstructed to the traffic signal, the system may then receive a traffic signal light state from the traffic signal via a V2I communications and display the traffic light signal state as a graphic on a heads up display (HUD) or other driver interface.

Figure 2:
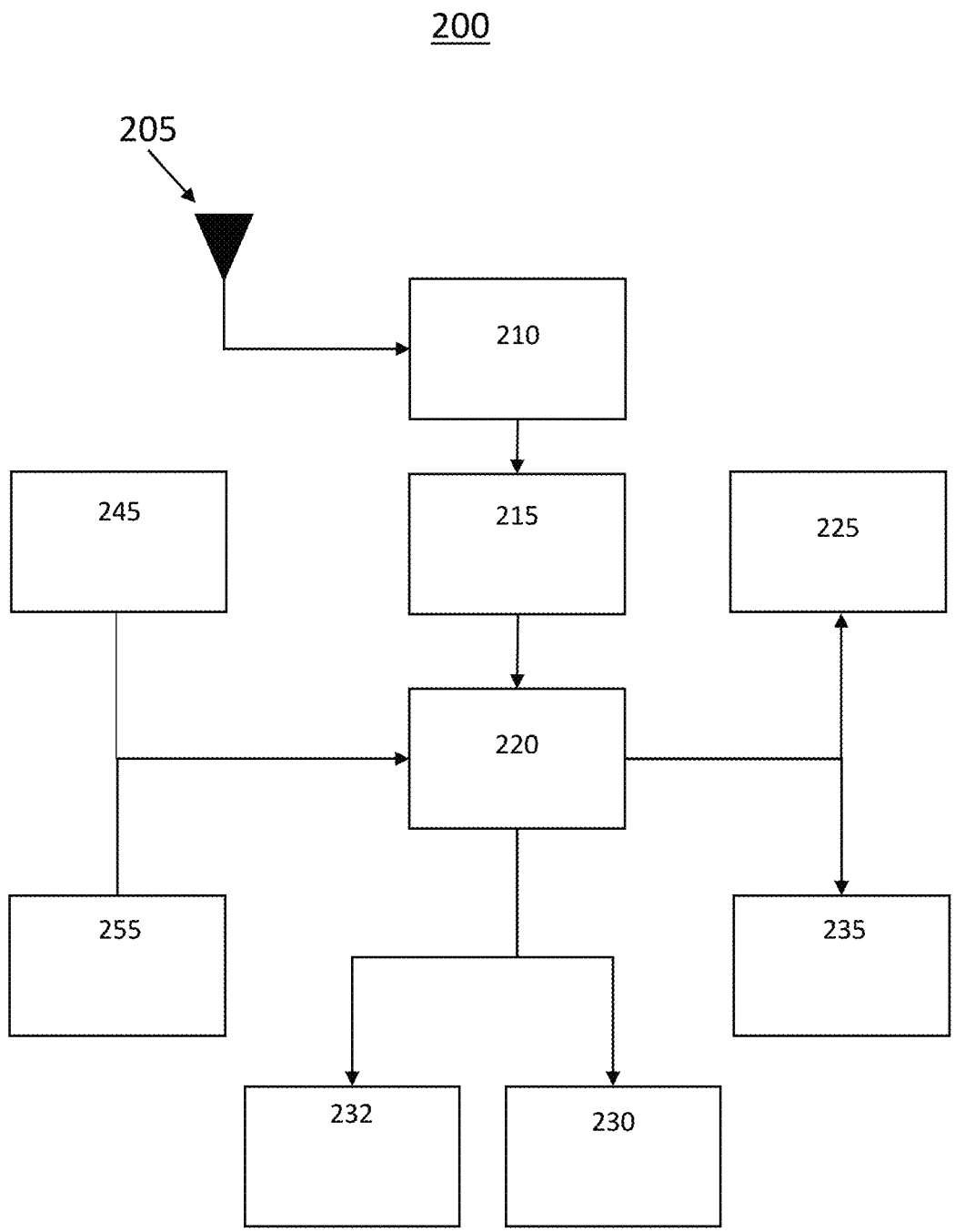
FIG. 2 shows a block diagram illustrating a system for implementing the traffic light visibility detection and augmented display system in a motor vehicle according to an exemplary embodiment of the present disclosure.

Turning now to FIG. 2, a block diagram illustrating a system 200 for implementing the traffic light visibility detection and augmented display system in a motor vehicle according to an exemplary embodiment of the present disclosure is shown. The exemplary system 200 may include an antenna 205, a Signal Phase and Timing (SPaT) receiver 210, a telemetrics module 215, a processor 220, a driver information center 230, an augmented reality (AR) heads up device (HUD) 225, a driver alert system 235, an object detection system 245, and a camera 255.

The SPaT receiver 210 may be configured to receive SPaT messages from a vehicle to infrastructure (V2I) transmitter via the antenna 205. The SPaT message may define the current intersection signal light phases and current state of all lanes at the intersection. The data received via the SPaT message may then be coupled to the telemetrics module 215 for processing and coupling to the processor 220. The telemetrics module 215 is configured to provide wireless connectivity between the host vehicle, other vehicles, infrastructure and data networks. The telemetrics module may include a plurality of antennas, modulators, demodulators, signal processors, and the like to process, transmit, and receive radio frequency signals carrying data for use by the vehicle, such as system updates, updated map data, infotainment system data and the like. The telemetrics module 215 may further include a GPS receiver for receiving GPS satellite signals used for determining a host vehicle location.

The object detection system 245 may be a lidar system operative to determine a distance to a proximate object, such as a leading vehicle. A lidar system may transmit a light pulse in a known direction and determine a distance to an object at the known direction in response to a propagation time of the light pulse. The lidar system may then repeat this operation a multiple known directions to generate a depth map representative of objects within the field of view. The depth information within the depth map may then be used to determine a height, width, and distance of a leading vehicle in front of the host vehicle. Alternatively, the object detection system 245 may be a radar system, infrared detection system or the like for performing a similar function.

The camera 255 may be used to capture an image of a field of view from the host vehicle. For example, the camera 255 may capture an image or a plurality of images at periodic time intervals for a field of view in front of the host vehicle. The images may depict a leading vehicle and be used to determine dimensions of the leading vehicle.

The processor 220 is first configured to determine a location of the host vehicle and a location of an upcoming traffic signal. The location of the host vehicle may be determined in response to GPS data received from the telemetrics module 215 and/or map data or other vehicle control data. The processor 220 then determines the location of the upcoming traffic signal in response to map data stored in a memory, in response to image data captured by the camera 255 and/or in response to data, such as a SPaT message received from the traffic signal or other proximate infrastructure. The SPaT message may be indicative of the traffic signal location, current states of the traffic signal for each lane in the intersection and time to a state change of each light in the traffic signal.

The processor 220 may next be configured to determine a distance between the host vehicle and the traffic signal in response to the traffic signal location and the host vehicle location. The processor 220 may next determine dimensions of a leading vehicle in response to the image data and/or the object detection system data. Dimensions of a leading vehicle may be determined in response to one or more of the images, using image processing techniques and the like. If the dimensions of the leading vehicle are greater than a threshold value, indicative of a possibility of an obstructed view of the traffic signal, the processor 220 next calculates a minimum distance to the leading vehicle where the traffic signal may still be visible to the host vehicle operator. If the minimum distance is greater than the actual distance between the leading vehicle and the host vehicle, the processor may be configured to generate a graphical user interface indicative of a current state of the traffic signal, such as a red light, and optionally a time to state change of the traffic signal. This graphical user interface may then be displayed on an AR HUD or other presentation display to the vehicle operator.

If the minimum distance to the leading vehicle has not been reached, the processor 220 may determine a vehicle speed of the host vehicle and/or a vehicle speed of the leading vehicle. The host vehicle speed may be determined in response to GPS data or in response to data from the vehicle controller 232. The processor 220 may next determine if a distance between the host vehicle and the leading vehicle is approaching the minimum distance. If the minimum distance is being approached, the processor 220 may generate a driver alert to be provided to the driver alert system 235, the driver information center 230 and/or the AR HUD 225. The driver alert system 235 may be configured to provide an alert to a vehicle operation that the threshold distance to the first vehicle will be soon reached and therefore views to the traffic signal may be obstructed. For example, the driver alert may be a flashing traffic signal graphic or the like. If the vehicle is an ADAS equipped vehicle and vehicle operation is currently being controlled by the ADAS system, the processor 220 may generate a control signal instructing the vehicle controller 232 or ADAS controller to reduce the host vehicle speed such that at least the minimum distance is maintained between the host vehicle and the leading vehicle.

Figure 3:
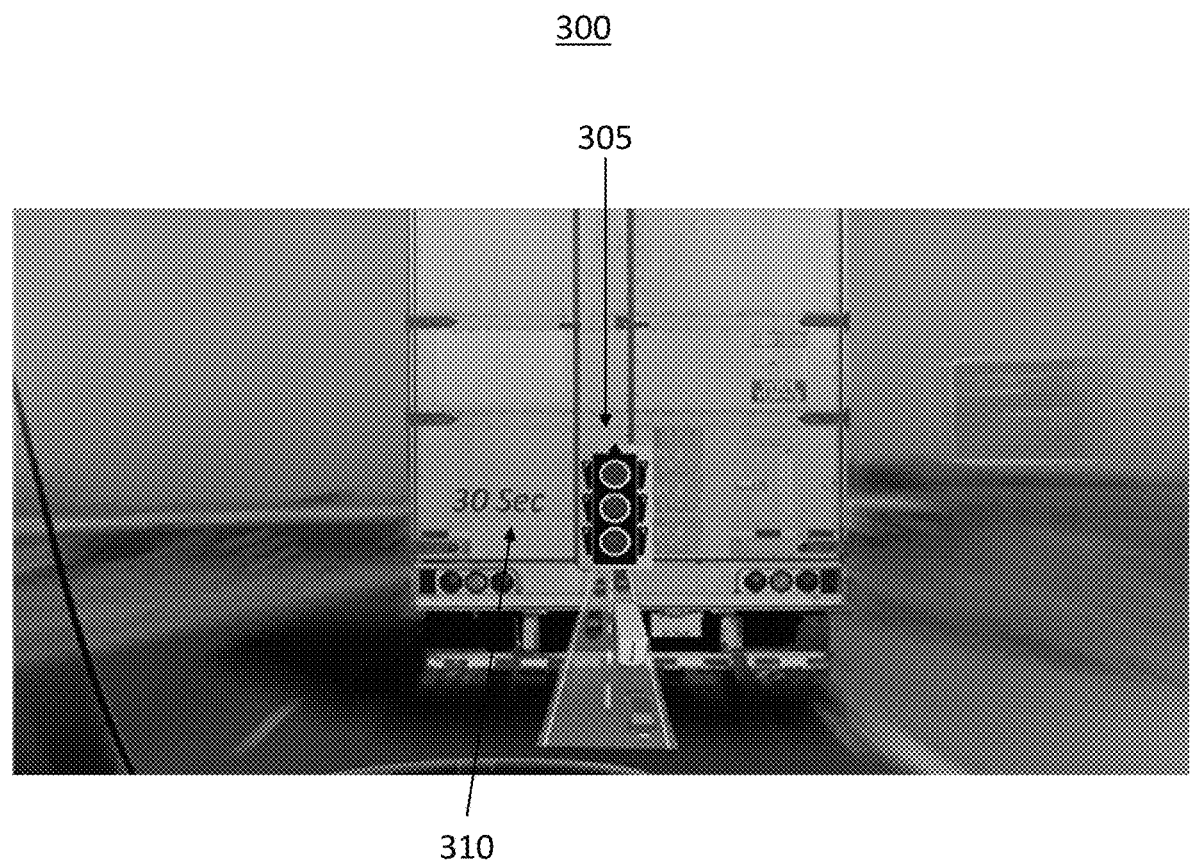
FIG. 3 shows a view of an exemplary graphical user interface presented in an AR HUD according to an embodiment of the present disclosure.

If the minimum distance is greater than the actual distance between the leading vehicle and the host vehicle, the processor may be configured to generate a graphical user interface indicative of a current state of the traffic signal, such as a red light, and optionally a time to state change of the traffic signal. This graphical user interface may then be displayed on an AR HUD or presentation to the vehicle operator. FIG. 3 illustrates a view 300 of an exemplary graphical user interface presented in an AR HUD. The exemplary view illustrates an augmented reality graphic 305 of the traffic signal with the current signal state correctly displayed. In some embodiments, the graphic 305 may be displayed in a location to the driver approximately where the traffic signal would be visible to the driver if not obstructed by the leading vehicle. In addition, the graphic may include a countdown timer 310 indicative of an upcoming time of a next state change of the traffic signal.

Figure 4:
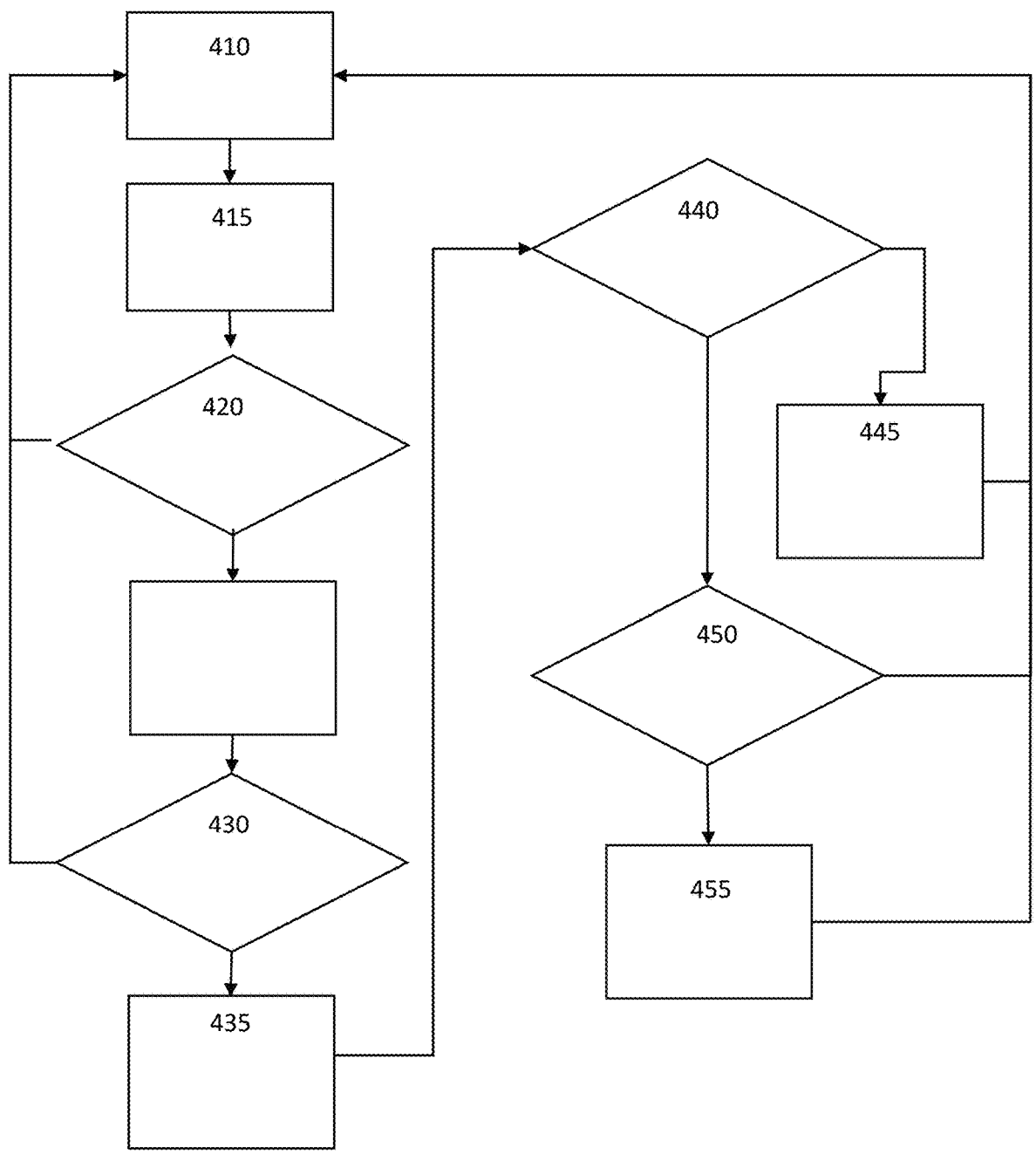
FIG. 4 shows a flow chart illustrating an exemplary method for performing the traffic light visibility detection and augmented display according to an exemplary embodiment of the present disclosure.

Turning now to FIG. 4, a flow chart illustrating an exemplary method 400 for implementing the traffic light visibility detection and augmented display system in a motor vehicle according to an exemplary embodiment of the present disclosure is shown. The exemplary method is first operative to detect 410 an upcoming traffic signal. The upcoming traffic signal may be detected in response to map data, in response to a host vehicle image or sensor data, and/or in response to reception of a SPaT message or the like. The SPaT message may be received via vehicle to infrastructure (V2I) communications or other wireless communications network. The SPaT message may be transmitted periodically, such as every 100 ms. The SPaT message may be indicative of a location of the traffic signal, a current phase of the traffic signal for every traffic lane of an intersection and/or a time remaining of the phase for every lane.

The method is next configured to calculate 415 a distance of the host vehicle to the traffic signal. The distance may be calculated in response to a host vehicle location determined in response to GPS data, map data, image data or the like, and the detected traffic signal location. The method is next configured to determine 420 if a leading vehicle is present. The presence of the leading vehicle may be determined in response to image data captured by a host vehicle camera, in response to V2V communications between the host vehicle and the leading vehicle, and/or in response to host vehicle sensor data, such as a lidar depth map or the like. If no leading vehicle is present, the method may return to detecting 410 a traffic signal location.

If a leading vehicle is present, the method is next configured to determine 425 dimensions of the leading vehicle. The dimensions of the leading vehicle may be determined in response to performing image processing techniques on an image captured by a host vehicle camera, in response to host vehicle sensor data, such as lidar, or in response to V2V communications with the leading vehicle. For example, using V2V communications, the leading vehicle may transmit data indicative of the leading vehicle location, velocity and dimensions. This data may be transmitted in response to a request by the host vehicle and/or periodically by the leading vehicle. In particular, the host vehicle may determine the height and width of the leading vehicle. The host vehicle may further determine a lateral position of the leading vehicle within the vehicle lane.

The leading vehicle dimensions are next compared 430 to a threshold. The threshold may be indicative that the leading vehicle may potentially block the view of the traffic signal to the host vehicle sensor or a host vehicle operator. If the dimensions of the leading vehicle do not exceed the threshold, the method may return to detecting 410 a traffic signal location. If the leading vehicle dimensions exceed the threshold, the method is next configured to determine a distance 435 to the leading vehicle. The distance to the leading vehicle may be determined in response to host vehicle sensor data, such as image or lidar depth map data, and/or location data of the host vehicle and the leading vehicle.

The distance is then compared 440 to a distance threshold. The distance threshold may be indicative of a distance behind the leading vehicle at which the host vehicle operator and/or sensors may lose visibility of the traffic signal. This distance threshold may be calculated in response to a distance from the host vehicle to the traffic signal, dimensions of the leading vehicle, and height and location of the traffic signal. As the host vehicle approaches the leading vehicle, the host vehicle operator's view of the traffic signal may become obstructed. The distance threshold may be dependent on the host vehicle speed and the leading vehicle speed and location.

If the distance to the leading vehicle is less than the distance threshold, indicating that the host vehicle view of the traffic signal may be obstructed by the leading vehicle, the method may be configured to display 445 an indication of the traffic signal state to the vehicle operator. This indication may be an augmented reality traffic signal displayed on an HUD or the like. Alternately, the indication may be displayed on a vehicle user interface, such as a center stack display, an instrument cluster display, or the like.

If the distance to the leading vehicle is greater than the distance threshold, the method next determines 450 if the distance is approaching the threshold distance. The distance may be approaching the threshold distance if the host vehicle is travelling faster than the leading vehicle. If the distance is not approaching the threshold distance, the method may return to detecting 410 a traffic signal location. If the distance is approaching the threshold distance, the method may next issue 455 a driver alert indicative to the vehicle operator that the traffic signal may soon not be visible to the vehicle operator, or may not be detectable by the host vehicle sensors. This driver alert may be a flashing light, a chime, buzzer or other audible alarm, or other graphic presented on a graphical user interface. In response to the driver alert, the vehicle operator or the ADAS may reduce the vehicle speed to ensure that at least the threshold distance is maintained between the leading vehicle and the host vehicle such that the traffic signal remains visible.

Figure 5:
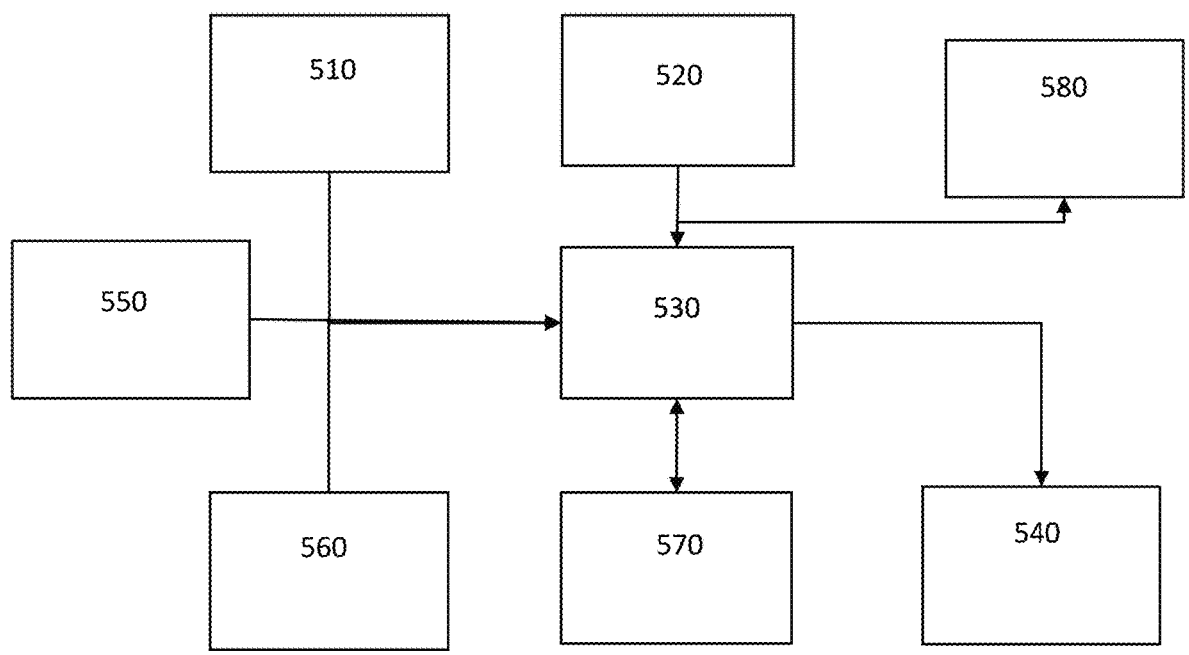
FIG. 5 shows another block diagram illustrating a system for implementing the traffic light visibility detection and augmented display system in a motor vehicle according to an exemplary embodiment of the present disclosure.

Turning now to FIG. 5, a block diagram of a system 500 for traffic light visibility detection and augmented display according to an exemplary embodiment of the present disclosure is shown. The exemplary system 500 may include a camera 510, a receiver 520, a processor 530, a display 540, a GPS 550, a memory 560, a lidar 570 and a vehicle controller 580.

The camera 510 may be integral to the host vehicle and may be configured for capturing an image wherein the image includes a representation of a leading vehicle. In some exemplary embodiments, the camera 510 may be a forward-facing camera for capturing a forward field of view from the host vehicle. The camera 510 may capture a series of images at periodic time intervals. The images may then be coupled to an image processor, or the processor 530, for analysis using image processing techniques. The images may be used to determine the leading vehicle location, distance between the leading vehicle and the host vehicle, distance and location of the traffic signal, dimensions of the leading vehicle and dimensions associated with the traffic signal, such as height off of the ground and the like.

The receiver 520 may be a radio frequency receiver or other wireless information receiver configured to receive data indicative of a traffic signal location and a traffic signal cycle state. The data may be transmitted from a traffic signal controller via a V2I communications channel or network. In some exemplary embodiments, the receiver 520 may be a SPaT receiver and the traffic signal location and the traffic signal cycle state are indicated in a SPaT data message.

The processor 530 may be a vehicle control processor, advanced driving assist processor or the like, configured to generate an augmented reality representation of the traffic signal including the traffic signal cycle state and may further include a countdown timer indicative of a time remaining in the traffic signal state cycle. The processor 530 may be configured to determine a leading vehicle dimension, a first distance between a host vehicle and the leading vehicle in response to the image captured by the camera 510. The processor 530 may next determine a second distance between the host vehicle and the traffic signal in response to a map data or the like. The processor 530 may then estimate a traffic signal view obstruction in response to the leading vehicle dimension, the first distance, and the second distance. The traffic signal view obstruction may be indicative of the leading vehicle obstructing a line of sight between a host vehicle operator or host vehicle sensor and the traffic signal. For example, the traffic signal view obstruction may be estimated in response to a height of the leading vehicle being within a line of sight between the host vehicle and the traffic signal. The processor 530 may then generate a graphical user interface in response to the traffic signal view obstruction.

The display 540 may be configured to receive the graphical user interface from the processor 530 and to display the graphical user interface to a vehicle operator on a display within the host vehicle. The graphical user interface displayed to the vehicle operator may be indicative of the traffic signal cycle state. The graphical user interface may also display a countdown timer indicative of a time remaining until an upcoming state change of the traffic signal. In some exemplary embodiments, the display 540 may be a heads up display configured for presenting an augmented reality representation of the traffic signal and the traffic signal cycle state to a vehicle operator.

The exemplary system 500 may further include GPS 550 for receiving a data from one or more satellites and estimating a host vehicle location in response to the received data. The GPS 550 may then couple GPS data to the processor 530 indicative of a host vehicle location. A memory 560 may be communicatively coupled to the processor 530 for storing a map data. The map data may be indicative of a traffic signal location. The system may further include a lidar 570 configured to capture a depth map indicative of the leading vehicle dimension and the first distance. The depth map may be used to determine dimensions of a leading vehicle and/or distances from the host vehicle to the leading vehicle and/or the traffic signal or the like.

The system 500 may further include a vehicle controller 580 for controlling one or more of the steering, throttle and/or braking of the host vehicle. The vehicle controller 580 may be configured to perform ADAS algorithms. The vehicle controller 580 may further provide data indicative of a host vehicle speed and wherein the processor is further configured to determine a future traffic signal view obstruction in response to the host vehicle speed, the leading vehicle dimension, the first distance, and the second distance and for generating a driver alert in response to the future traffic signal obstruction.

In some exemplary embodiments, the system 500 may be an advanced driver-assistance system including a GPS 550 configured for receiving a location data indicative of a host vehicle location. A host vehicle sensor may include a camera and a lidar for capturing an image. The image may be used for detecting a leading vehicle dimension and a first distance between a host vehicle and the leading vehicle. In addition, the system may include a receiver 520 configured to receive a traffic signal data indicative of a traffic signal location and a traffic signal cycle state. A processor 530 may be configured to determine a traffic signal view obstruction between the host vehicle and a traffic signal in response to the host vehicle location, the first distance, the traffic signal location and the leading vehicle dimension. The system 500 may further include a display 540 configured to visually present a representation of the traffic signal to a vehicle operator in response to the determination of the traffic signal view obstruction and the traffic signal cycle state.

The exemplary system may further include a vehicle controller 580 for detecting a host vehicle speed. The processor 530 may be further configured to determine a future traffic signal view obstruction in response to the host vehicle speed, the leading vehicle dimension, the first distance, and the traffic signal location and for generating a driver alert in response to the future traffic signal obstruction.

Figure 6:
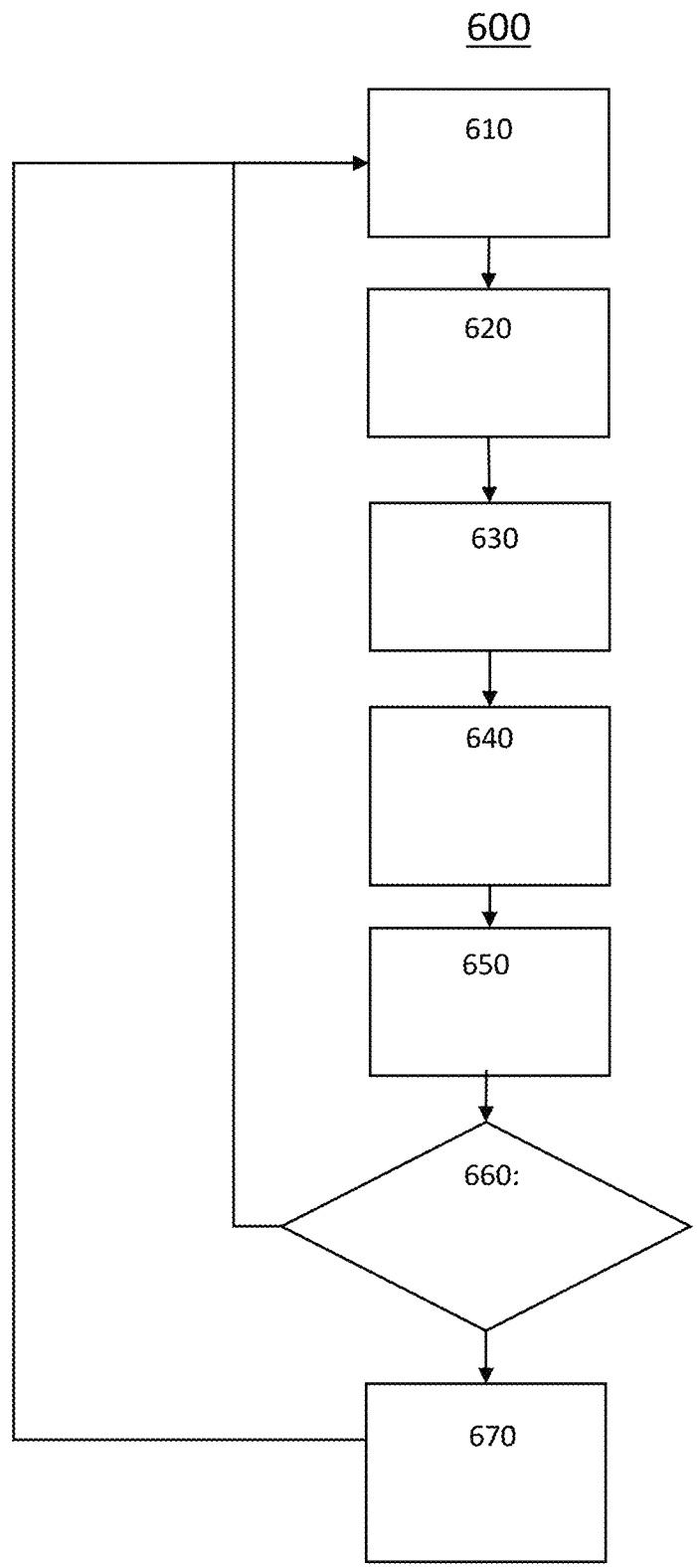
FIG. 6 shows another flow chart illustrating an exemplary method for performing the traffic light visibility detection and augmented display according to an exemplary embodiment of the present disclosure.

Turning now to FIG. 6, a flow chart illustrating another exemplary method 800 for implementing a traffic light countdown notification and alert suppression system in a motor vehicle according to an exemplary embodiment of the present disclosure is shown. The method is first operative for capturing 610, by a host vehicle camera, an image of a leading vehicle. In some exemplary embodiments, the image may be a depth map captured by a lidar system.

The method is next operative for determining 620 a host vehicle location in response to a location data received via a GPS or global navigation satellite system (GNSS). The host vehicle location may be indicated by the received data and may be confirmed in response to map data stored within a memory and correlation with landmarks or other indicators proximate to the host vehicle and detected with other host vehicle sensors.

The method next estimates 630 a leading vehicle dimension and a first distance between a host vehicle and the leading vehicle in response to the image. Image processing techniques in addition to multiple images captured at different time intervals may be used to determine a leading vehicle dimension, such as height or width. In addition, the distance from the host vehicle to the leading vehicle may be estimated using multiple images which may vary in time and or space. Alternatively, the leading vehicle dimension and the first distance between a host vehicle and the leading vehicle may be determined in response to a depth map generated by a host vehicle lidar system.

The system may then receive 640 a data indicative of a traffic signal location and a traffic signal cycle state, the data indicative of the traffic signal location is stored in a memory in the host vehicle. The data may be received from the traffic signal controller or the like via a V2I communications channel. The V2I communications channel may be a wireless radio frequency channel. The data indicative of the traffic signal location and the traffic signal cycle state may be received via a SPaT data message received by a SPaT data receiver.

The method next determines 650 a second distance between the host vehicle and the traffic signal. The location of the host vehicle may be determined in response to the GPS or GNSS data. The location of the traffic signal may be determined in response to map data or may be determined in response to sensor data such as a camera image or a lidar depth map.

The method is next configured for determining 660 a traffic signal view obstruction in response to the leading vehicle dimension, the first distance, and the second distance. The traffic signal view obstruction may be estimated in response to a portion of the leading vehicle being within a line of sight between the host vehicle and the traffic signal. The obstruction may be determined using geometric techniques to determine an intersection between the height and or width of the leading vehicle in a line of sight from the vehicle operator to the traffic signal. In some exemplary embodiments, the method may further determine a future traffic signal view obstruction in response to a host vehicle speed, the leading vehicle dimension, the first distance, and the second distance and for generating a driver alert in response to the future traffic signal obstruction. If a traffic signal view obstruction is determined, the method next generates 670 a graphical user interface indicative of the traffic signal cycle state in response to the traffic signal view obstruction. The graphical user interface may include a graphical representation of the traffic signal including the current traffic signal cycle state, such as red or green, as well as a countdown timer indicative of a remaining time in the current traffic signal cycle state.

The method is then configured for displaying 680 the graphical user interface to a vehicle operator via a heads up display. The graphical user interface may be an augmented reality representation of a traffic signal indicative of the traffic signal cycle state and is presented to a vehicle operator on an augmented reality heads up display. Alternatively, the graphical user interface may be a display screen within the vehicle cabin viewable by the vehicle operator, such as a center stack display, instrument cluster display, dashboard display or the like.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An apparatus comprising:
    a camera for capturing an image wherein the image includes a representation of a leading vehicle;
    a receiver configured to receive a traffic signal location and a traffic signal cycle state;
    a processor configured to estimate a leading vehicle height and a leading vehicle width, a first distance between a host vehicle and the leading vehicle in response to the image, a second distance between the host vehicle and a traffic signal in response to the traffic signal location, estimating a traffic signal view obstruction in response to the leading vehicle height and the leading vehicle width, the first distance, and the second distance, and generating a graphical user interface in response to the traffic signal view obstruction;
    a vehicle controller for reducing a host vehicle speed in response to the traffic signal view obstruction to ensure that at least a threshold distance is maintained between the host vehicle and the leading vehicle such that the traffic signal remains visible; and
    a display configured to display the graphical user interface wherein the graphical user interface is indicative of the traffic signal cycle state.

2. The apparatus of claim 1, wherein the graphical user interface is further indicative of a time to state change of the traffic signal.

3. The apparatus of claim 1, further including a memory for storing a map data indicative of the traffic signal location.

4. The apparatus of claim 1, wherein the display is a heads up display.

5. The apparatus of claim 1, wherein the traffic signal view obstruction is estimated in response to the leading vehicle height exceeding a threshold value and the first distance being greater than a minimum distance.

6. The apparatus of claim 1, further including a lidar configured to capture a depth map indicative of the leading vehicle height and the leading vehicle width and the first distance.

7. The apparatus of claim 1, wherein the graphical user interface is at least one of a center stack display and an instrument cluster display.

8. The apparatus of claim 1, wherein the processor is further configured to determine a future traffic signal view obstruction in response to the host vehicle speed, the leading vehicle height and the leading vehicle width, the first distance, and the second distance and for generating a driver alert in response to the future traffic signal view obstruction indicative of a time to the future traffic signal view obstruction.

9. The apparatus of claim 1 wherein the graphical user interface is an augmented reality representation of the traffic signal indicative of the traffic signal cycle state and wherein the display is an augmented reality heads up display.

10. A method comprising:
    capturing, by a host vehicle camera, an image of a leading vehicle;
    estimating a leading vehicle height and a leading vehicle width and a first distance between a host vehicle and the leading vehicle in response to the image;
    receiving a data indicative of a traffic signal location and a traffic signal cycle state;
    determining a second distance between the host vehicle and a traffic signal;
    estimating a traffic signal view obstruction in response to the leading vehicle height and the leading vehicle width, the first distance, and the second distance;
    reducing a host vehicle speed in response to the traffic signal view obstruction to ensure that at least a threshold distance is maintained between the host vehicle and the leading vehicle such that the traffic signal remains visible; and
    generating a graphical user interface indicative of the traffic signal cycle state in response to the traffic signal view obstruction.

11. The method of claim 10, further including determining a host vehicle location in response to a location data received via a global positioning system.

12. The method of claim 10, further including displaying the graphical user interface to a vehicle operator via a heads up display.

13. The method of claim 10, wherein the data indicative of the traffic signal location is stored in a memory in the host vehicle.

14. The method of claim 10, wherein the traffic signal view obstruction is estimated in response to a portion of the leading vehicle being within a line of sight between the host vehicle and the traffic signal.

15. The method of claim 10, wherein the leading vehicle height and the leading vehicle width and the first distance between the host vehicle and the leading vehicle are determined in response to a depth map generated by a host vehicle lidar system.

16. The method of claim 10, wherein the data indicative of the traffic signal location and the traffic signal cycle state is received via a SPaT data message received by a SPaT data receiver.

17. The method of claim 10, further including determining a future traffic signal view obstruction in response to the host vehicle speed, the leading vehicle height and the leading vehicle width, the first distance, and the second distance and for generating a driver alert in response to the future traffic signal view obstruction.

18. The method of claim 10 wherein the graphical user interface is an augmented reality representation of the traffic signal indicative of the traffic signal cycle state and is presented to a vehicle operator on an augmented reality heads up display.

19. An advanced driver-assistance system comprising:
a global positioning system configured for receiving a location data indicative of a host vehicle location;
a host vehicle sensor for detecting a leading vehicle height and a leading vehicle width and a first distance between a host vehicle and a leading vehicle;
a receiver configured to receive a traffic signal data indicative of a traffic signal location and a traffic signal cycle state;
a processor configured to determine a traffic signal view obstruction between the host vehicle and a traffic signal in response to the host vehicle location, the first distance, the traffic signal location, the leading vehicle height and the leading vehicle width;
a vehicle controller for reducing a host vehicle speed in response to the traffic signal view obstruction to ensure that at least a threshold distance is maintained between the host vehicle and the leading vehicle such that the traffic signal remains visible; and
a display configured to display a representation of the traffic signal in response to the traffic signal view obstruction and the traffic signal cycle state.

20. The advanced driver-assistance system of claim 19, wherein the processor is further configured to determine a future traffic signal view obstruction in response to the host vehicle speed, the leading vehicle height and the leading vehicle width, the first distance, and the traffic signal location and for generating a driver alert in response to the future traffic signal view obstruction.

* * * * *